…

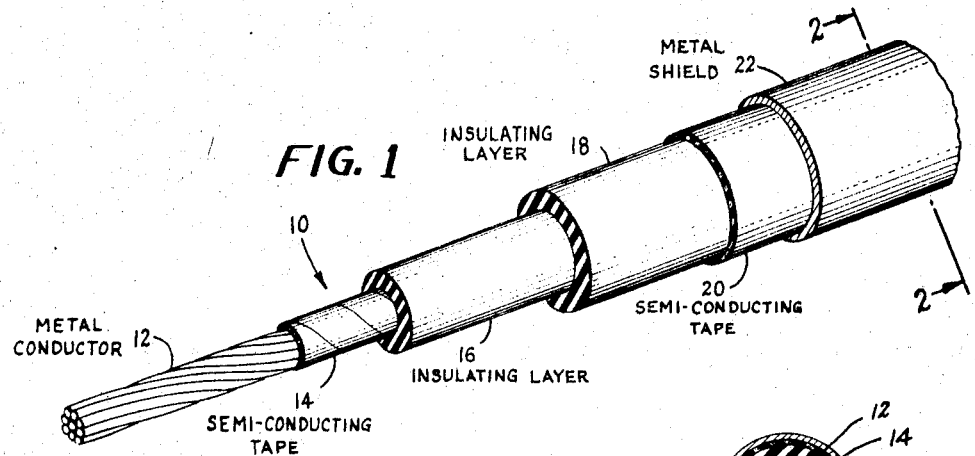
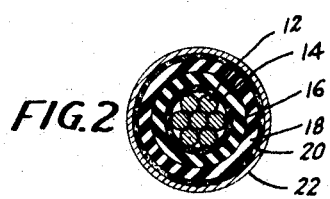
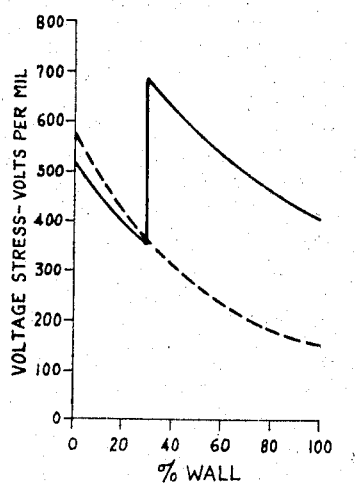
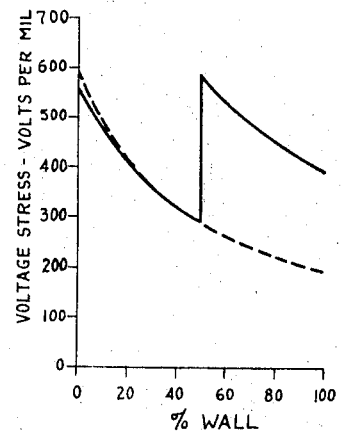
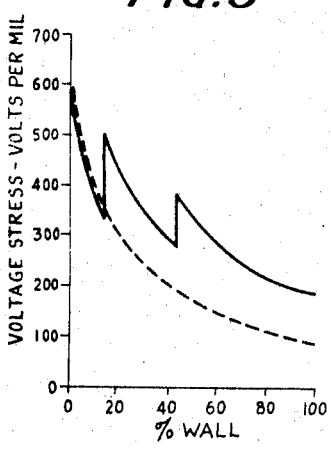
INVENTORS
STEPHEN ZYSK,
BURTON T. MACKENZIE, JR.
ATTORNEY

United States Patent Office 3,433,891
Patented Mar. 18, 1969

3,433,891
GRADED INSULATED CABLE
Stephen Zysk, Stratford, and Burton T. MacKenzie, Jr.,
Monroe, Conn., assignors to General Electric Company, a corporation of New York
Filed Dec. 29, 1966, Ser. No. 605,797
U.S. Cl. 174—120                                                           16 Claims
Int. Cl. H01b 7/20, 7/34

ABSTRACT OF THE DISCLOSURE

An insulated cable of graded construction which has a plurality of layers of insulation each formed of a cross-linked ethylene containing polymer, and each layer as characterized by a different dielectric constant is arranged or graded in descending order outwardly from the conductor.

---

A single homogeneous layer of insulation on an energized conductor exhibits a predictable voltage stress pattern, and the voltage stress at any point in the insulation may be calculated by the following formula:

$$S = \frac{E}{r_x \log_e \frac{D}{d}}$$

where S is the stress in volts per mil at a point x in the insulation, E is the voltage across the insulation in volts, $r_x$ is the radius to the point x in mils, d is the inside diameter of the insulation surrounding the conductor, and D is the outside diameter of the insulation surrounding the conductor. The stress curve for a cable may be plotted as X–Y coordinates on a graph showing the thickness of the insulation wall in mils versus the stress in volts per mil. The voltage breakdown for the insulation wall may be determined experimentally by the conventional voltage step test. From the voltage breakdown determined by the step test and from the formula above for voltage stress, the stress curve for the insulation can be plotted.

Two or more layers of insulation may be applied over the conductor, with each layer having a different dielectric constant arranged or graded in a preferred order. As a result, the voltage stress pattern for the insulation wall is altered. The maximum benefit is obtained when the innermost layer of insulation has the highest dielectric constant or specific inductive capacitance. If the total insulation wall thickness is the same as that for a single homogeneous layer, the voltage breakdown level for the insulation is increased; or, as a correlary thereto, for a given voltage breakdown level, the total wall thickness for the layer insulation can be made thinner than the single layer of insulation. Insulation construction of this type is known as a graded construction.

A graded construction for insulated cable is particularly significant in the development of high power electric cable adaptable for carrying high voltage loads, e.g. 69,000 volts grounded neutral. Before the development of cross-linked polyethylene, impregnated insulating papers were commonly used in a graded construction, and for still higher voltage cables such as those for carrying 138,000 volts or higher, paper insulation in a fluid-filled system has been the only useful insulating material. In a typical cable of graded construction employing paper as the insulating material, the paper is impregnated with oil, and the cable is then hermetically sealed in a lead sheath or in a metal pipe. This type of paper cable typically has a specific inductive capacitance or dielectric constant of about 3.5 to 3.7 and a power factor in the neighborhood of about 1%. These values are significant in that for minimizing power losses for a cable it is desirable to have as low a specific inductive capacitance and power factor as possible. The power loss for a single conductor cable, measured in terms of watts lost per foot of cable, is determined by the following formula:

$$W = \frac{E^2 \times f \times SIC \times PF \times 0.000106}{\log_e \frac{D}{d}}$$

where E is the voltage across the insulation in kilovolts, f is the frequency in cycles per second, SIC is the specific inductive capacitance for the cable, PF is percent power factor for the cable, d is the inside diameter of the insulation surrounding the conductor and D is the outside diameter of the insulation surrounding the conductor. It thus can be seen for a minimum loss in power, the specific inductive capacitance and power factor should be as low as possible.

However, paper-type insulated graded cable has several distinct disadvantages or limitations. The cable is difficult to install and requires special handling and equipment for forming joints, connections and terminals and requires special equipment for maintaining pressure. Also, the paper-type insulated cable has a temperature rating of only 75° C. as specified by the Association of Edison Illuminating Companies.

This invention has as its purpose to provide an improved graded cable, particularly such a cable adaptable for carrying high voltages, which overcomes the distinct disadvantages of paper-type insulated cable and which exhibits relatively low power losses.

These together with other objects and advantages will best be understood by referring to the following detailed description of the invention, and to the accompanying drawings in which:

FIGURE 1 is a perspective view of a graded cable falling within the scope of the present invention with portions thereof cut away for the purpose of better illustrating its construction;

FIGURE 2 is a cross-sectional view taken on line 2—2 of FIGURE 1;

FIGURES 3, 4 and 5 are graphs showing voltage stress for insulated cables and are included herein to facilitate explanation of the present invention.

In accordance with the present invention, there is provided an insulated electrical cable comprising a metallic conductor and a graded insulation surrounding the conductor of a plurality of layers, each layer having a different dielectric constant or specific inductive capacitance graded in descending order outwardly from the conductor. Each layer of insulation is composed of a cross-linked, thermosetting ethylene-containing polymer, and titanium dioxide filler is incorporated into one or more layers in varying quantities depending upon the number of layers involved and upon the specific inductive capacitance desired, as explained in greater detail hereinbelow. An insulated cable of this construction exhibits a high votlage breakdown level, low power losses and a high temperature rating. Moreover, lead sheath or metallic encasements have been eliminated thereby greatly facilitating installation of the cable.

Referring now to FIGURE 1, there is illustrated a cable of graded construction formed in accordance with the invention and indicated generally by the numeral 10, which includes an inner metallic conductor 12 illustrated in the form of a stranded cable, although it should be understood that the conductor 12 may comprise a solid conductor. Generally, a semi-conducting layer 14, e.g. tape, is applied around the metal stranded conductor for the purpose of establishing a good electrical contact between the conductor and the insulation and further to shield out stresses thereby equalizing all stresses of the individual strands. Cable 10, as shown in the drawing, includes inner insulation layer 16 and outer insulation layer 18, but it should be understood that a cable of graded construction falling within the scope of this invention may include more than two layers of insulation. Also, the cable usually has a second semi-conducting layer or tape 20, such as a nylon-impregnated tape, a metal shield 22 such as a copper shield, and, overlaying this, an outer jacket (not shown) of conventional material. All insulation layers of the cable are formed of a cross-linked ethylene-containing polymer, and the specific inductive capacitance for the successive layers of insulation decreases from the innermost layer to the outermost layer. Cross-linked polyethylene, for example, has a known specific inductive capacitance, which value may be increased by incorporating titanium dioxide filler into the composition before curing. The innermost layer of insulation is constructed to have the highest specific inductive capacitance and the outermost layer the lowest. This is accomplished by varying the titanium dioxide filler content in each layer, with the innermost insulation layer containing the highest percentage of titanium dioxide filler and the filler content in each successive layer decreasing outwardly from the conductor. The difference in specific inductive capacitance between the innermost layer and the outermost layer of insulation for the cable desirably is as great as possible, without a loss or sacrifice in other desired properties, and preferably should be not less than about 1.5 when measured within a temperature range of from about 20° to 100° C., and still more preferably not less than 2, when tested by ASTM D–150. The specific inductive capacitance for each layer of insulation is relatively stable when measured over the aforesaid temperature range. In the preferred embodiment of the invention, sufficient titanium dioxide is incorporated into the innermost layer to provide this layer with a specific inductive capacitance greater than 4.2. Further, the graded cable exhibits a specific inductive capacitance of not greater than about 4 when measured within the aforesaid temperature range, and a power factor not greater than 1 percent. The specific inductive capacitance for the cable depends upon such factors as the difference between the specific inductive capacitances for the insulation layers, the actual specific inductive capacitance of each layer and the wall thickness of each layer, and the cable therefore should be designed so that its specific inductive capacitance is not undesirably high whereby the power losses are minimized as determined by the formula set forth above.

The polymer composition for the insulation layers of the graded cable includes an ethylene-containing member selected from the group consisting of polyethylene, blends of polyethylene and other polymers, and copolymers of ethylene and other polymerizable materials. Polyethylene may be used alone or may be used in conjunction with one or more other polymers, but this will depend largely upon the requirements of the end product. Other suitable polymers for blending and/or copolymerizing with ethylene include, for example, vinyl acetate, ethyl acrylate, propylene, ethylene-propylene copolymer, ethylene-propylene terpolymer and butene-1, wherein the blend or copolymer comprises not less than 50% by weight ethylene, and preferably 70% to 90% by weight ethylene, and the balance being the other polymeric material. In the preferred embodiment, all of the insulation layers of the graded construction are formed of cross-linked polyethylene, and although the invention is described hereafter with specific reference to polyethylene, it should be understood that blends or copolymers of ethylene are also useful.

Titanium dioxide filler is incorporated into one or more of the insulation layers to control the specific inductive capacitance of the layer. The term "filler" (when used in association with titanium dioxide) as used herein and in the appended claims refers to titanium dioxide incorporated into the ethylene-containing polymer to alter measurably the specific inductive capacitance of the cured insulating layer, and generally is used in an amount of not less than 10 parts of filler per 100 parts of polymer, thereby distinguishing filler from a coloring pigment. The titanium dioxide filler typically possesses a particle size of about 0.2 to 0.4 microns (mean diameter) and a specific gravity of about 3.9 to 4.1. Also, the rutile crystalline structure has been found particularly useful. The specific inductive capacitance for an insulation layer is increased with an increased amount of titanium dioxide filler, and, for the graded construction of this invention the innermost layer contains the highest amount. Thus, the specific inductive capacitance of the successive layers of insulation decreases from the innermost layer, which has the highest specific inductive capacitance, to the outermost layer, which has the lowest specific inductive capacitance. Generally, the outermost insulation layer will contain no titanium dioxide filler, but where desired may contain a relatively small amount of titanium dioxide for use as a coloring pigment only.

As explained above, cross-linked polyethylene has a known specific inductive capacitance of approximately 2.25. In order to provide a graded construction of desired spread in specific inductive capacitance between layers of insulation, the innermost layer has incorporated therein not less than 100 parts of titanium dioxide filler per 100 parts of cross-linked polyethylene, and preferably from 115 to 125 parts of filler to 100 parts polyethylene. When less than 100 parts titanium dioxide filler are employed in the innermost layer, the desired spread in specific inductive capacitance between the innermost layer and outermost layer is not achieved. On the other hand, it is generally not necessary to employ more than about 125 parts titanium dioxide filler to 100 parts of polyethylene because no further advantage is apparently achieved for most known high power electric cables. Generally, no titanium dioxide filler is incorporated in the outermost layer of insulation except, if desired, as a coloring pigment. That is, the titanium dioxide renders the polyethylene insulation white, and for quality control purposes it may be desirable to employ not more than 5 parts titanium dioxide per 100 parts of polyethylene, and preferably about 2 to 3 parts titanium dioxide. However, the titanium dioxide may be omitted altogether from the outermost layer, or another coloring pigment or dye may be used in the outermost layer. If it is desired to color the outermost layer black, for example, a small quantity in the order of 2 to 4 parts carbon black may be incorporated with the polyethylene during compounding. Where more than two layers of insulation are used in the graded construction, the titanium dioxide filler content for the intermediate layers is between that of the inner and outer layers. For a graded cable having three layers, for example, the filler content for the middle layer should be sufficient so that this layer has a specific inductive capacitance approximately intermediate the inner and outer layers.

In the preferred embodiment, the titanium dioxide filler is treated with an alkoxy silane, and preferably an alkoxy silane selected from the group consisting of lower alkyl alkoxy silane, alkenyl alkoxy silane and alkynyl alkoxy silane. Halogenated silanes, such as chloro-silanes, are not desirable when they are incorporated into the curable composition during the fabrication stage because of their corrosive activity and further because of their deleterious effects on electrical properties. However, where the titanium dioxide filler is pre-treated with the chloro-silane in a separate operation and then treated to remove the chlorine-containing by-products, and the treated filler is then compounded with the polyethylene, a chloro-silane may be employed without showing any corrosive activity on the machinery or apparatus. Generally, in practicing the invention, the titanium dioxide filler and alkoxy silane are added separately to the polymeric material, and the admixture is compounded as in a Banbury. During this compounding operation, the alkoxy silane apparently coats or interacts with the filler. The titanium dioxide filter is treated with about 0.2 to 3% by weight of alkoxy silane. An excess of alkoxy silane apparently acts like a plasticizer, which consequently appears to degrade the tensile strength and electrical properties of the cured composition, and therefore is avoided. Suitable alkoxy silanes include, for example, methyl triethoxy silane, methyl tris (2-methoxyethoxy) silane, dimethyldiethoxy silane, allyltrimethoxy silane, and the vinyl silanes such as vinyl tris (2-methoxyethoxy) silane, vinyl trimethoxy silane, and vinyl triethoxy silane.

As a further modification of the invention, an electrical grade filler (other than titanium dioxide, as explained above) may be incorporated into the outermost insulation layer. The filler is treated with about 0.2 to 3% by weight of an alkoxy silane, as described above with reference to the titanium dioxide. The function of such fillers in polymeric insulation compositions is well known, and the filler content in the insulation layer may range from about 25 to 45% by weight of the composition, and preferably from about 30 to 40% by weight. Suitable fillers may include aluminum silicate, aluminum oxide, calcium silicate, magnesium silicate and mixtures thereof. The filler may contain certain inert impurities, typically metallic oxides, which may range up to about 5% by weight of the filler. These filler materials typically are calcined to reduce the moisture content to less than 0.5% by weight, and possesses a particle of the order of 2 microns diameter and a specific gravity of about 2.5 to 2.8. However, also applicable is a magnesium silicate filler having a plate-like structure, a particle size not greater than 6 microns, and desirably a specific surface area of 18 to 20 square meters per gram as determined by BET Gas Absorption Method, and a specific gravity of about 2.7 to 2.8. Where desired, a small amount of titanium dioxide, in the order of about 2 to 3 parts per 100 parts of polymer, may be added to the composition for pigmenting purposes.

In preparing the composition, each layer must be compounded separately because of the gradation in specific inductive capacitance. In a typical compounding operation, the polymer, titanium dioxide filler and alkoxy silane, where employed, and other additives such as antioxidant are intimately admixed as in a Banbuary. During this compounding operation the filler becomes treated by the alkoxy silane whereby the problem of electrical stability of filler in water is overcome. A suitable curing agent, desirably a tertiary peroxide, is then incorporated into the admixture to effect cross-linking of the polymer upon curing. The compounding operation containing the curing agent is conducted within a temperature range high enough to render the composition sufficiently plastic to work but below the reacting temperature or decomposition temperature of the curing agent so that substantially little or no decomposition of the curing agent occurs during a normal cycle. The resulting compounded admixtures are subsequently fabricated as by extrusion in a continuous process. Each layer is extruded separately onto the cable so as to provide a graded insulation cover for the cable. The fabricated product is then cured such as by conventional steam curing at about 250 p.s.i.g. and 400 to 410° F.

Desirably, the curing agent employed in the operation is a peroxide, preferably a tertiary peroxide, and characterized by at least one unit of structure

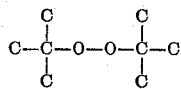

which decomposes at a temperature in excess of 130° C. The use of these peroxide curing agents in effecting cross-linking in polymeric compounds is adequately described in U.S. Patents 3,079,370 and 2,888,424, both to Precopio and Gilbert, which patents are incorporated in this specification by reference. Another useful curing agent includes the acetylenic high molecular weight diperoxy compounds disclosed in U.S. Patent 3,214,422, which patent is also incorporated in this specification by reference.

The proportion of peroxide curing agent used depends largely on the mechanical properties sought in the cured product, for example, hot tensile strength. A range of from about 0.5 to 10 parts peroxide by weight per hundred parts of total polymeric content satisfies most requirements, and the usual proportion is of the order of three to four parts peroxide. In a typical production operation employing a tertiary peroxide as a curing agent, compounding is conducted at a temperature of from about 100 to 130° C., and preferably from 100 to 120° C. If compounding is conducted at a temperature much higher than the stated maximum, the peroxide will decompose thereby causing premature curing of at least a portion of the polymeric compounds. As a consequence, the compound will be difficult to fabricate and the final product will exhibit an irregular or roughened surface.

The invention is further illustrated in the following examples:

EXAMPLE I

A number of insulation compositions were prepared according to the recipes shown in Table I by conventional means on a two-roll heated rubber mill, all parts shown being by weight:

TABLE I.—RECIPES

| Component | A | B | C | D |
|---|---|---|---|---|
| Polyethylene | 100 | 100 | 100 | 100 |
| Flectol H | 1 | 1.75 | 1.75 | 1.75 |
| Titanium dioxide | 100 | 115 | 115 | 115 |
| Vinyltris (2-methoxyethoxy) silane | | | 3.45 | |
| Methyltris (2-methoxyethoxy) silane | | | | 3.45 |
| Di cup T | 3.55 | 3.55 | 3.55 | 3.55 |

Flectol H is 1,2-dihydro-2,2,4-trimethylquinoline, used as an antioxidant, and Di cup T is di-α-cumyl peroxide (90% active) used as a curing agent. The samples were press cured for 6 minutes at 180° C. and heat treated for 4 hours at 100° C.

The compositions were formed into slabs, and each sample was evaluated for electrical properties, and the results are shown in Table II, below:

TABLE II.—PROPERTIES OF SLAB SAMPLES

| Test | A | B | C | D |
|---|---|---|---|---|
| Volume resistivity [1] | 3,250 | 4,810 | 4,521 | 4,996 |
| Percent power factor [2] | 0.23 | 0.14 | 0.17 | 0.18 |
| Specific inductive capacitance [3] | 4.09 | 4.26 | 4.38 | 4.35 |
| Dielectric strength [4] | 1,005 | 1,346 | 1,115 | 1,220 |

[1] ASTM test Modified D-257.
[2] ASTM test D-150.
[3] ASTM test D-150.
[4] ASTM test D-149.

Further testing under moisture conditions and at elevated temperatures on samples B, C and D showed the following results:

TABLE III.—PROPERTIES ON SAMPLES

| Test | B | C | D |
|---|---|---|---|
| 7 days soak in H₂O at 75° C., tested at R.T.: | | | |
| Percent power factor | 3.21 | 0.69 | 0.39 |
| Specific inductive capacitance | 5.16 | 4.32 | 4.27 |
| Dry at 100° C.: | | | |
| Percent power factor | 0.54 | 0.54 | 0.58 |
| Specific inductive capacitance | 3.21 | 3.74 | 3.65 |

Table III illustrates that, for stable electrical properties under moisture conditions, the alkoxy silane treated titanium dioxide filler exhibits certain advantages and therefore is preferred. Also, sample C had a tensile strength of 2620 and an elongation of 340%, both measured at room temperature pursuant to ASTM D–413, thereby showing excellent physical properties.

These tests, although on slabs, are indicative of good physical and electrical properties for cable, and correlated closely with the results shown on the graded cable set forth in the following examples.

EXAMPLE II

In the following examples, the insulation compositions were compounded by conventional means in a Banbury, extruded on a wire conductor and then pressure steam cured.

A typical shielded cable adaptable for carrying a load of 35,000 volts grounded neutral was built comprising a homogeneous insulation having a wall thickness of 345 mils on a 2/0 AWG copper conductor. The insulation was formed of clay filled cross-linked polyethylene containing about 50 parts of aluminum silicate clay per 100 parts polyethylene. FIGURE 3 shows the stress curve for this insulation. The abscissa of the curve represents the thickness in mils of the insulation and the ordinate represents the stress in volts per mil. From the voltage breakdown value for the insulation material as determined by the voltage step test which showed that the cable failed at 123,800 volts and from the dimensions of the cable, one can plot the voltage stress curve showing the voltage existing across the insulation wall. This is shown by the broken line in FIGURE 3.

FIGURE 3 also shows a stress curve for a shielded cable of graded construction having two layers of insulation made in accordance with this invention and extruded on a 2/0 AWG copper conductor. The inner insulation layer comprises cross-linked polyethylene having incorporated therein 115 parts of titanium dioxide filler per 100 parts polyethylene treated with three percent by weight of vinyltris (2-methoxyethoxy) silane based on the weight of filler. Also, the inner insulation layer has a specific inductive capacitance of 4.8. The outer insulation layer comprises cross-linked polyethylene and contains no titanium dioxide filler and has a specific inductive capacitance of 2.4. The total thickness for the insulation is 345 mils, and the inner insulation layer comprises 30% of the total wall thickness. From the voltage step test the cable failed at 175,000 volts. The voltage stress was plotted as above for the single layer of insulation, and is shown by the solid line. It will be observed from the graph that the voltage across the insulation wall has been redistributed thereby increasing substantially the utilization factor for the graded cable. In comparison, the voltage stress for the single layer of insulation is very high near the conductor and very low toward the outside. The power factor for the cable was 0.41% and the specific inductive capacitance 2.94, thereby indicating that the cable would have low power losses.

EXAMPLE III

For a cable of graded construction having two layers of insulation, it is advantageous to provide a cable having substantially equal maximum gradients at the conductor surface and at the interface between the layers, because if the latter is higher and the cable construction is weak, such as voids occurring at this interface, overstressing can occur with a result in failure of the insulation. The wide spread in specific inductive capacitance values for the two insulating layers is especially desirable in order to lower the maximum gradient to the lowest point. In addition, when the insulation layers are of substantially equal thickness, the extruder output is more nearly equalized thereby facilitating fabrication.

In FIGURE 4, the stress curve (broken line) was plotted for a 69,000 volt cable having a single layer of insulation with a wall thickness of 650 mils. The insulation was of the same composition as the single layer insulation plotted in FIGURE 3. This cable failed at 215,000 volts. The stress curve (solid line) was also plotted for a cable of graded construction of the same composition and specific inductive capacitance as that for the graded cable of FIGURE 3, excepting that the inner insulation layer and outer insulation layer are of substantially the same thickness. Here again, the curve shows that not only has the voltage been redistributed, but that redistribution can be controlled, and further that the maximum gradients at the interface have been reduced substantially. The power factor was 0.75% and the specific inductive capacitance 3.51, thereby indicating low power losses for the cable.

In FIGURE 5, the curve (broken line) is plotted for a 230,000 volt cable having a single layer of insulation of clay filled cross-linked polyethylene with a wall thickness of 2.1 inches. The cable shows a failure at 450,000 volts. The stress curve (solid line) was also plotted for a cable of graded construction having three layers of insulation. The innermost layer comprises 15% of the total wall thickness and has a specific inductive capacitance of 4.8; the intermediate layer is 30% of the wall thickness and has a specific inductive capacitance of 3.2; the outermost layer is 55% of the wall thickness and has a specific inductive capacitance of 2.4. The cable shows a voltage breakdown level at 670,000 volts, thereby illustrating again the superiority of the graded construction.

We claim:

1. An electric cable comprising a metallic conductor, and a graded insulation surrounding the conductor composed of a plurality of layers each formed of a cross-linked polymeric member selected from the group consisting of polyethylene, blends of polyethylene and other polymers, and copolymers of ethylene and other polymerizable materials, the innermost layer having incorporated therein titanium dioxide filler treated with an alkoxy silane in the range of not less than 100 parts per 100 parts of said polymeric member and the outermost layer containing no titanium dioxide filler, said cable characterized by a specific inductive capacitance of not greater than about 4 and a power factor not greater than about one percent.

2. An electric cable according to claim 1 wherein said cross-linked polymeric member is polyethylene.

3. An electric cable according to claim 1 wherein said cross-linked polymeric member is an ethylene-propylene copolymer.

4. An electric cable according to claim 1 and including at least one intermediate layer having incorporated therein said titanium dioxide filler, said filler content in intermediate layers decreasing outwardly from said conductor, and said innermost layer having a specific inductive capacitance greater than about 4.5.

5. A cable according to claim 1 wherein said titanium dioxide filler was treated with from about 0.5 to 3% by weight of a vinyl silane.

6. An electric cable according to claim 1 wherein the voltage gradient at the conductor and the voltage gradient at the interface between the layers are at about their maximum value and are substantially equal.

7. An electric cable according to claim 1 wherein said innermost layer comprises about 25% to 75% of the total wall thickness of said graded insulation.

8. An electric cable according to claim 1 wherein said cable comprises two layers of insulation and the wall thickness of said innermost layer and said outermost layer are substantially equal.

9. An electric cable according to claim 1 wherein said outermost layer has incorporated therein an electrical grade filler treated with alkoxy silane.

10. An electric cable according to claim 9 wherein said filler is selected from the group consisting of aluminum silicate, aluminum oxide, calcium silicate, magnesium silicate and mixture thereof.

11. An electric cable comprising a metallic conductor, and a graded insulation surrounding the conductor which comprises two layers each formed of cross-linked polyethylene and having substantially the same wall thickness, the innermost layer having incorporated therein titanium dioxide filler in the amount of about 115 to 125 parts filler per 100 parts of said polyethylene and the outermost layer containing no titanium dioxide filler, said filler treated with an alkoxy silane, said innermost layer characterized by a specific inductive capacitance greater than 4.2 and relatively stable over a temperature range from about 20° C. to 100° C., and said cable characterized by a specific inductive capacitance of not greater than 4 and a power factor not greater than 0.8 percent.

12. An electric cable according to claim 11 wherein said outermost layer has incorporated therein an electrical grade filler treated with an alkoxy silane.

13. An electric cable adaptable for carrying a voltage load of at least about 35,000 volts comprising a metallic conductor, and a graded insulation surrounding the conductor which comprises two layers each formed of cross-linked polyethylene and having substantially the same wall thickness, the innermost layer having incorporated therein titanium dioxide filler in the range of not less than 100 parts filler per 100 parts of said polyethylene and the outermost layer containing no titanium dioxide filler, said filler treated with about 0.5 to 3 percent by weight by vinyl silane, said innermost layer characterized by a specific inductive capacitance greater than 4.2 and relatively stable over a temperature range from about 20° C. to 100° C., and said cable characterized by a specific inductive capacitance of not greater than 4 and a power factor not greater than 0.8 percent.

14. An electric cable according to claim 13 wherein said outermost layer has incorporated therein an electrical grade filler treated with an alkoxy silane.

15. An electric cable comprising a metallic conductor, and a graded insulation surrounding the conductor composed of a plurality of layers each formed of cross-linked polyethylene, the innermost layer having incorporated therein titanium dioxide filler in the range of about 100 to 125 parts filler per 100 parts of said polyethylene and the outermost layer containing no titanium dioxide filler, said filler treated with about 0.5 to 3% by weight of an alkoxy silane, said innermost layer characterized by a specific inductive capacitance greater than 4.2 and relatively stable over a temperature range from about 20° C. to 100° C., and said cable characterized by a specific inductive capacitance of not greater than 4 and a power factor not greater than one percent.

16. An electric cable according to claim 15 wherein said outermost layer has incorporated therein an electrical grade filler treated with an alkoxy silane.

References Cited

UNITED STATES PATENTS

| | | | |
|---|---|---|---|
| 3,047,448 | 7/1962 | Feller | 174—102 X |
| 3,287,489 | 11/1966 | Hvizd | 174—120 X |

OTHER REFERENCES

Blodget et al.: Corona & Heat-Resistant Cable Insulation in IEEE Transactions on Power, December 1963, p. copy in 174–110.

Nizinski: Silicon Rubber Graded . . . Insulation in Wire & Wire Products, vol. 37, #5, May 1962, pp. 628, 633, 634 and 677, TS270A1W5.

LEWIS H. MYERS, *Primary Examiner.*

ELLIOTT A. GOLDBERG, *Assistant Examiner.*

U.S. Cl. X.R.

174—102, 110, 121; 117—218